United States Patent
Gupta et al.

(10) Patent No.: US 7,555,585 B2
(45) Date of Patent: Jun. 30, 2009

(54) OPTIMIZED PERFORMANCE AND POWER ACCESS TO A SHARED RESOURCE IN A MULTICLOCK FREQUENCY SYSTEM ON A CHIP APPLICATION

(75) Inventors: Vikram Gupta, Fremont, CA (US); Ed Lambert, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 147 days.

(21) Appl. No.: 11/592,284

(22) Filed: Nov. 2, 2006

(65) Prior Publication Data
US 2008/0005437 A1 Jan. 3, 2008

Related U.S. Application Data

(60) Provisional application No. 60/817,852, filed on Jun. 30, 2006.

(51) Int. Cl.
G06F 12/00 (2006.01)
G06F 1/12 (2006.01)
(52) U.S. Cl. ........................ 710/241; 713/600
(58) Field of Classification Search ................. 710/240, 710/241, 22, 308; 713/400, 501, 600
See application file for complete search history.

(56) References Cited

U.S. PATENT DOCUMENTS

| | | | | |
|---|---|---|---|---|
| 5,345,109 | A | * 9/1994 | Mehta | 327/115 |
| 6,163,583 | A | * 12/2000 | Lin et al. | 375/354 |
| 6,401,176 | B1 | * 6/2002 | Fadavi-Ardekani et al. | 711/151 |
| 6,600,575 | B1 | * 7/2003 | Kohara | 358/406 |
| 6,735,712 | B1 | * 5/2004 | Maiyuran et al. | 713/501 |
| 6,990,594 | B2 | * 1/2006 | Kim | 713/322 |
| 2007/0098004 | A1 | * 5/2007 | Lada | 370/437 |

OTHER PUBLICATIONS

Definition of DMA (Direct Memory Access) by Wikipedia, undated.*

* cited by examiner

*Primary Examiner*—Khanh Dang
(74) *Attorney, Agent, or Firm*—Brake Hughes Bellermann LLP

(57) ABSTRACT

A request from a first processor for access to a shared resource in a computing system is received, and access is provided to the shared resource by the first processor at a first clock frequency. A request from a second processor for access to a shared resource in a computing system is received, and access is provided to the shared resource by the second processor at a second clock frequency that is lower than the first clock frequency.

16 Claims, 6 Drawing Sheets

OPTIMIZED PERFORMANCE AND POWER ACCESS TO A SHARED RESOURCE IN A MULTICLOCK FREQUENCY SYSTEM ON A CHIP APPLICATION

CROSS-REFERENCE TO RELATED APPLICATIONS

This application claims priority to U.S. Provisional application Ser. No. 60/817,852, filed on Jun. 30, 2006, entitled "OPTIMIZED ACCESS TO A SHARED RESOURCE," which is hereby incorporated by reference for all purposes.

TECHNICAL FIELD

This description relates to sharing resources in a computer environment.

BACKGROUND

Power-efficient operation and maximization of performance are two important issues in the design of modern electronic devices. For example, wireless devices often are powered by a battery or other internal power source. However, when a user has to charge or change the battery too often, the device becomes less useful, and therefore power-efficient operation of such a device is important for enhancing the user's experience of the device.

For a device that can be plugged into, and operated with line power, power-efficiency is less critical. However, with the increasing prevalence of wireless devices (e.g., Bluetooth devices), the time associated with recharging batteries of the wireless device and the time of not having the device available when it is needed becomes a hurdle that can limit the practical utility of the devices.

SUMMARY

In a general aspect, a request from a first processor for access to a shared resource in a computing system is received, and access is provided to the shared resource by the first processor at a first clock frequency. A request from a second processor for access to a shared resource in a computing system is received, and access is provided to the shared resource by the second processor at a second clock frequency that is lower than the first clock frequency.

In another general aspect, a system includes a first processor configured to access a shared resource in a computing system and a second processor configured to access a shared resource. The system also includes clock circuitry configured to provide a clock signal for clocking access to the shared resource. The clock circuitry is configured to provide the clock signal with a first clock frequency when the first processor accesses the shared resource and wherein the clock circuitry is configured to provide the clock signal with a second clock frequency when the second processor accesses the shared resource.

The details of one or more implementations are set forth in the accompanying drawings and the description below. Other features will be apparent from the description and drawings, and from the claims.

DETAILED DESCRIPTION

Modern electronic devices can include a main processor (e.g., a central processing unit (CPU)) and one or more other peripheral processors (e.g., co-processors). The main processor and the peripheral processor can be located on a single semiconductor chip that may be known as a system-on-a-chip (SOC). The main processor and the peripheral processor each may be capable of accessing a shared resource, such as a block of memory. Bandwidth requirements of the main processor and the peripheral processor(s) for accessing the shared resource may be different, depending on the function of, or the tasks being handled by, the different processors. For example, a CPU may require high-bandwidth access to the shared resource, while a peripheral processor may only require low-bandwidth access to the shared resource. When power-efficiency is not a critical issue, the processor with the highest bandwidth requirements may be used to set the frequency of operation for the shared resource. Thus, the shared resource may be clocked at a relatively high frequency to provide sufficient bandwidth to satisfy the needs of the processor with the highest bandwidth requirements.

Because processors with the lower bandwidth requirements are capable of accessing the shared resource at a lower clock frequency and still performing satisfactorily, they are capable of using less energy from a battery when they perform their operations. However, if the highest bandwidth processor is used to set a common clocking configuration for accessing the shared resources, a power penalty exists due to handshaking requirements when a low-bandwidth peripheral processor accesses the shared resource.

Conversely, another approach to allowing multiple processors to access a shared resource might maximize power-efficiency but sacrifice performance. In one example, a multi-bus system may include a plurality of processors capable of running at different clock speeds and capable of accessing a shared resource. To synchronize the system, the clocks of all processors might be set to handshake with a bus operating at the lowest clock speed. Therefore, a high-speed processor, operating on a separate bus may be set to run at the lowest speed when the shared resource (e.g. a memory device) is accessed. Operation at the lowest clock speed, although conserving power, may affect performance of some processors, since devices and/or peripherals would otherwise operate at a higher frequency, and hence have a better performance, are required to operate at a low frequency to handshake with the lower clock speed bus, so they can access a shared resource and synchronize with other slower processors.

Figure 1:
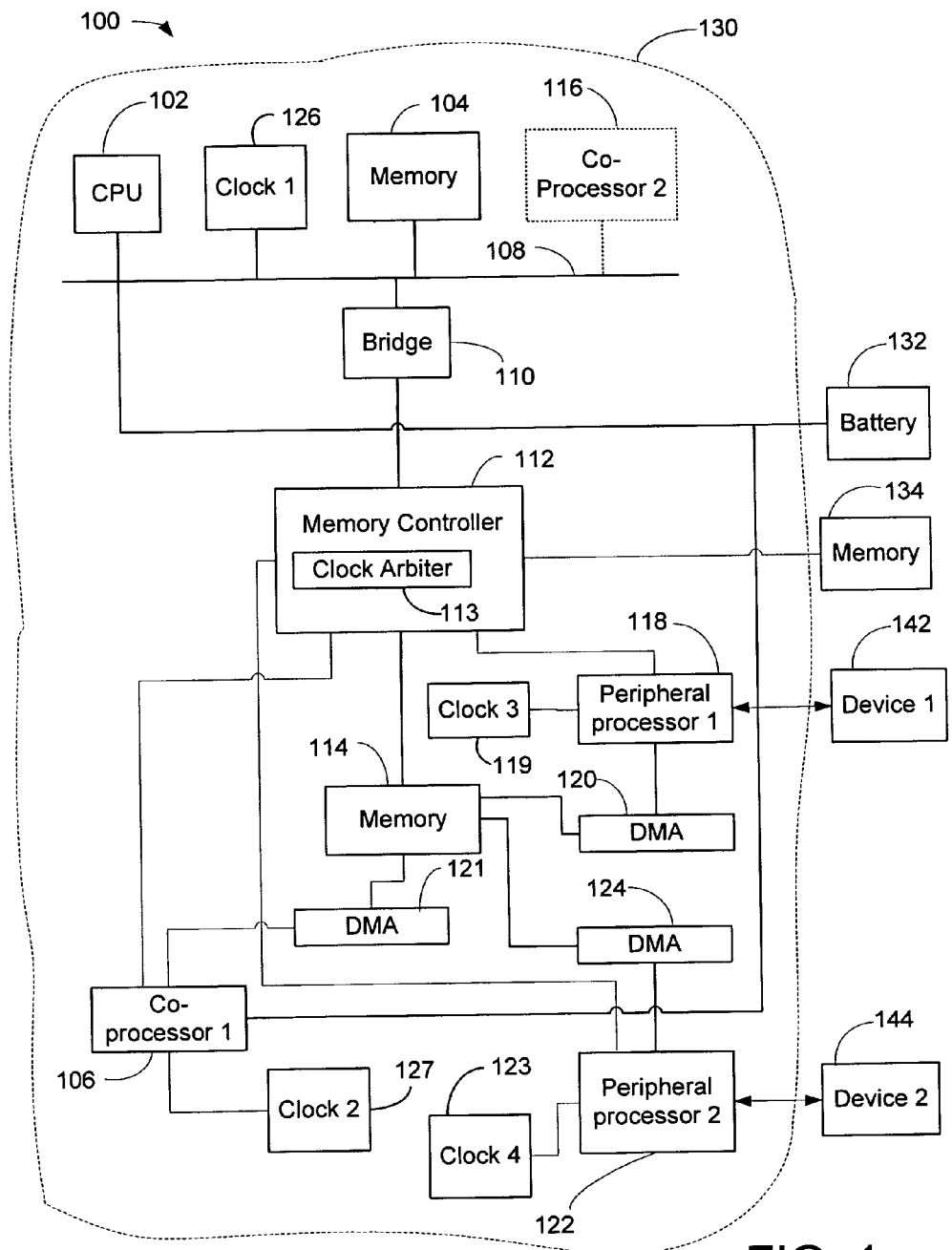
FIG. 1 is a block diagram of a system in which multiple processors can access a shared resource.

FIG. 1 is a block diagram of a computing system 100 in which multiple processors can access a shared resource, and the clock speed at which the shared resource is accessed is varied in real time according to which processor accesses the resource. Such a system conserves power when processors that can tolerate low-bandwidth access to the resource access the resource at the low clock frequency, but the system provides high performance when high bandwidth processors access the resource at a high clock frequency. The computing system 100 can include a first processor 102 (e.g., a host processor or a CPU) that may be connected by a bus 108 to a memory 104, a clock 126, and a bridge 110. The clock 126 can set the frequency with which the processor 102 exchanges data and addresses with other shared resources (e.g., a memory) that are accessible to the processor 102. The bridge 110 can be connected to a memory controller 112 that is coupled to a shared resource 114, which may be a main system memory.

The memory 104 coupled to the bus 108 may be a read-only memory (ROM) for storing a basic input and output system (BIOS) used to boot the computing system 100 or a fast random access memory (RAM) cache available to the host processor when performing operations on data. The shared resource 114 may be, for example, a memory, such as, a synchronous RAM (SRAM) or other type of memory used temporarily to store data written by, or to be provided to, a processor in the computing system 100 that is performing operations on data. The memory controller 112 may control data read/write operations between the processors of the system 100 and the memory 114. The computing system 100 includes a bus 108 for carrying data and addresses between the host processor 102 and the various components in computing system 100.

The computing system 100 may also include a second processor 106 and/or a third processor 116 for processing data. The second processor 106 and the third processor 116 may be co-processors adapted for performing one or more specific operations on data in an efficient manner, according to an example embodiment. For example, the co-processors 106 and 116 may be math co-processors adapted for performing arithmetic operations on data, or co-processors adapted for coding and/or decoding data in a particular format (e.g., an MP3 co-processor for coding and/or decoding data in an MP3 format or a Bluetooth co-processor for coding/decoding data in a Bluetooth format). These are just a few examples, and the disclosure is not limited thereto. Many other types of co-processors may be used. A clock 127 coupled to the co-processor 106 can set the frequency with which the co-processor operates and accesses a shared resource 114 coupled to the co-processor 106.

Although not required, according to an example embodiment, a direct memory access (DMA) channel (e.g., a DMA device) may be connected to each co-processor to facilitate the transfer of data between the co-processor (106 and/or 116) and memory 114 and/or 104. For example, a DMA channel 121 may be connected to co-processor 106 to handle data transfers between co-processor 106 and memory 114, as shown in FIG. 1. Although not shown, a similar DMA channel may be connected to co-processor 116.

The computing system 100 may also include one or more peripheral processors 118 and 122 through which components of the computing system 100 may interface with one or more platform devices. For example, the peripheral processors 118 and 122 may be a Universal Serial Bus (USB) devices (or interfaces) for transferring data to and from a platform device 142 or 144 using a USB protocol, or a Universal Asynchronous Receiver Transmitter (UART) device or interface for transferring data to and from a platform device 142 or 144 using a UART protocol, although many other types of peripherals or interfaces may be used. A direct memory access (DMA) device (or channel) 120 or 124 may couple a peripheral processors, 118 or 122, respectively, directly to the memory 114. DMA devices 120 and 124 may transfer data directly between memory 114 and peripheral devices 118 and 122, respectively, without relying upon host processor 102 to handle such data transfer. Each peripheral processor 118 or 122 can be coupled to a clock 119 or 123, respectively, that sets a frequency at which the respective processor exchanges data and addresses with components to which it is connected (e.g., the memory 114), and the frequency of each clock may be different.

For example, the first processor 102 can be a CPU, and the peripheral processor 118 can be a decoder that typically operates at a much lower frequency than the frequency at which the CPU operates. In one implementation, the first processor 102 can be a CPU of a SOC, and the peripheral processor 118 can be an audio encoder. In such a system, the clock 126 can operate at a relatively high frequency, such that the CPU 102 can achieve maximum performance. However, the third clock 119 operates at a relatively low frequency, such that the encoder 118 that is coupled to the third clock 119 can perform adequately but without wasting power unnecessarily.

Thus, processor 102 and co-processor 116 may reside in a first clock domain, while co-processor 106 and peripheral processors 118 and 122 may reside, respectively, in second, third, and fourth clock domains. The bridge 110 may separate the first clock domain from the second, third, and fourth clock domains. The first clock domain may use a first clock 126 to control the operation of the first processor 102, for example, when the first processor accesses the shared resource 114. The second, third, and fourth clock domains can use second, third, or fourth clocks 127, 119, and 123, respectively, to control the operation of the co-processor 106, the first peripheral processor 118, or the second peripheral processor 122, respectively, when one of such processors accesses the shared resource 114.

Components 102-127 of the computing system may all be located on a single chip 130, such that portions of the computing system 100 may be known as a system-on-a-chip (SOC), although the system is not limited thereto. Components of the computing system 100, for example, the processor 102 and the co-processors 106 and 116, and the peripheral processors 118 and 122 may be powered by a battery 132. In an example embodiment, the entire system 100 may be powered by battery 132, but in another implementation portions of the system can be powered by the battery. The SOC may also be coupled to an external memory 134 that may store data or instructions to be accessed, performed or executed by a processor 102, 106, or 116 of the SOC.

When the system 100 is powered-on, the host processor 102 may configure the peripheral processor 118 and 122 and their respective DMAs 120 and 124 for communication with external platform devices 142 and 144, and during operation of the computing system 100, the multiple processors 102, 106, 118, and 122 can access a shared resource (e.g., the memory 114 or memory 134). For example, the processor 102 and a peripheral processor 118 may both operate on data in the memory 114. In one example implementation, a data stream may be received by the computing system 100 from a platform device 142 through the peripheral processor 118, and the data stream may be loaded into the memory 114. The data loaded in memory 114 can be extracted from the memory and processed by the processor 102 or by the co-processor 116. The different processors 102 and 116 can exchange data and addresses with the shared resource at different frequencies set by their respective clocks 126 and 119.

A clock arbiter 113, which, for example, may be included in the memory controller 112, may be used to determine which clock 126, 127, 119, or 123 sets the frequency at which processors 102, 106, 116, 118, and 122 access the shared resource 114. For example, the first processor 102 may access the shared resource 114 at a frequency given by the first clock 126, but when the first processor has finished accessing or using the shared resource 114, the peripheral processor 118 may attempt to access the shared resource 114. If the peripheral processor 118 is capable of accessing the shared resource 114, the clock arbiter 113 may enable the third clock 119 to control the frequency with which the peripheral processor 118 accesses the shared resource 114. Alternatively, when the peripheral processor 118 is finished accessing the shared resource 114 and the first processor 102 seeks to access the shared resource 114, the clock arbiter 113 can re-enable the first clock 126 to control the frequency at which the first processor 102 accesses the shared resource 114. In another implementation, multiple processors, each operating at its own unique clock frequency can access the shared resource 114, and the frequency at which each different processor accesses the resource can be controlled by a clock arbiter 113.

Figure 2:
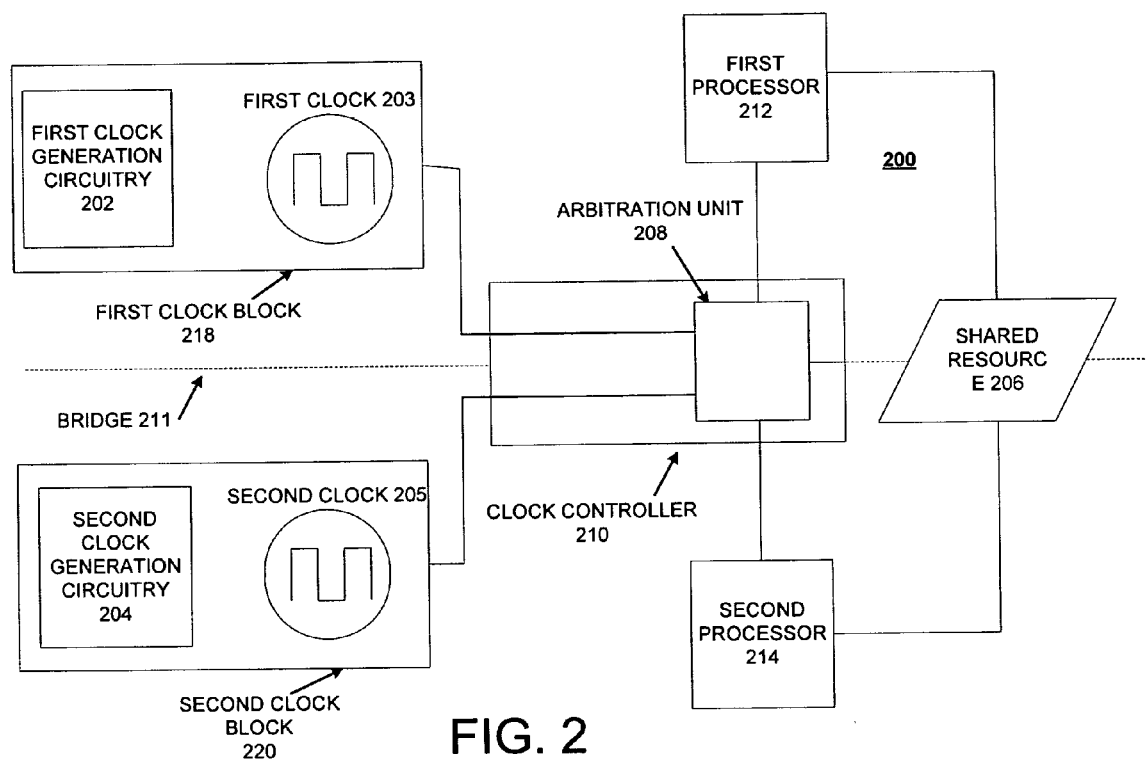
FIG. 2 is another block diagram of a system in which multiple processors can access a shared resource.

FIG. 2 is another block diagram of a system 200 in which multiple processors can access a shared resource. The system 200 can include a shared resource 206 that may be accessed or otherwise used by a first processor 212 and a second processor 214. The first processor 212 can reside on a first side of a bridge 211, and the second processor 214 can reside on a second side of the bridge 211.

A first clock block 218 can include a first clock 203 and first clock generation circuitry 202 to control the operation of the first processor 212, for example, when the first processor 212 accesses the shared resource 206. A second clock block 220 can include a second clock 205 and second clock generation circuitry 204 to control the operation of the second processor 214, for example, when the second processor 214 accesses the shared resource 206.

A clock controller 210 can include an arbitration unit 208. The arbitration unit 208 may receive an input signal from the first processor 212 and from the second processor 214, for example in the form of a request for access to the shared resource 206. The arbitration unit 208 may perform one or more operations or processes to determine what type of processor is requesting access to the shared resource 206. For example, the arbitration unit 208 may determine whether the processor is a high frequency processor or a low frequency processor. Since different processes may utilize different clocks having differing speeds, the arbitration unit may determine and provide the correct clock to use with the processor that is requesting access to the shared resource, if the processor has its request granted for access to the shared resource 206.

Output from the first clock 203 and output from the second clock 205 may be based on a signal from a single oscillator. Thus, a single oscillator may output a periodic first pulse train that defines a first clock frequency, and a replica of the pulse train can be passed through a pulse swallower that periodically removes pulses from the pulse train to produce a second pulse train having a second clock frequency that is a fraction of the frequency of the frequency of the pulses in the first pulse train.

Depending on which processor 212 or 214 is accessing the shared resource 206, the clock frequency at which the shared resource 206 is operated may be made either faster or slower on the fly. If the first processor 212 is, for example, a CPU or a decoder (i.e., a relatively high-bandwidth processor), and the shared resource 206 is a main memory, then the arbitration unit 208 can select a high-frequency signal output from the first clock block 218 to clock the shared resource 206. Similarly, if the second processor 214 is a relatively low-bandwidth processor (e.g., a Bluetooth encoder designed to provide sound to a speaker in a headset) and the shared resource 206 is a main memory, then the arbitration unit 208 can select a low-frequency signal output from the second clock block 218 to clock the shared resource 206.

Figure 3:
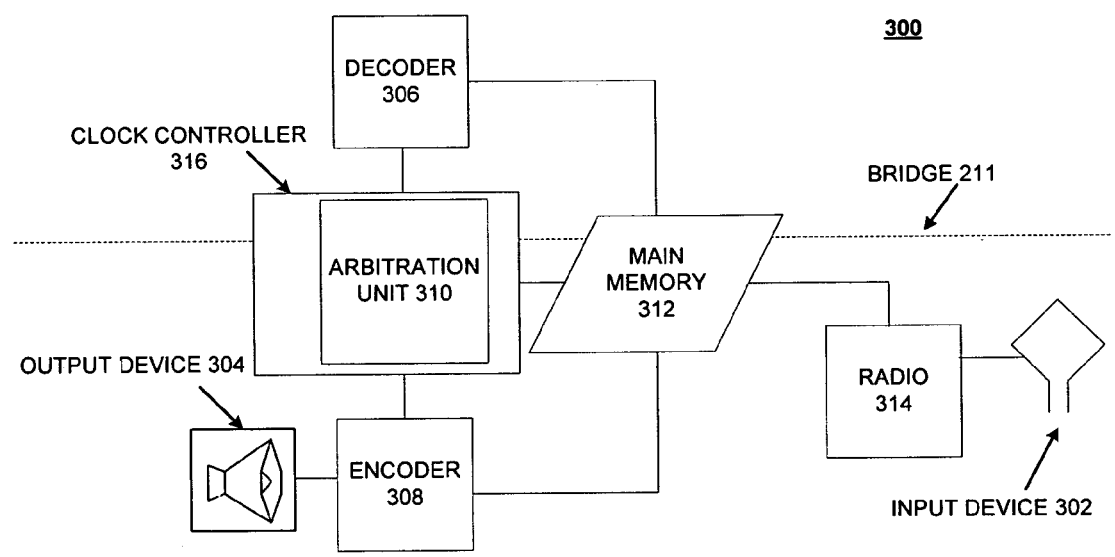
FIG. 3 is another block diagram of a system in which multiple processors can access a shared resource.

FIG. 3 is another block diagram of a system 300 in which multiple processors can access a shared resource. The system 300 can include a main memory 312 that can be accessed or otherwise used by an encoder 308 and a decoder 306 in a conventional process, for example one that is performed by an audio or video CODEC. The decoder 306 can reside on a first side of a bridge 211 in a first clock domain, and the encoder 308 can reside on a second side of the bridge 211 in a second clock domain.

A radio receiver 314 can receive input from an input device 302. The input device may be, for example, an antenna that receives digital or analog radio signals. The radio signals, or any data received by the radio receiver 314, such as .MP3, .WAV, or audio data of any other format can be passed from the radio receiver 314 to the main memory 312. Data in the main memory may be used to provide a final output signal to an output device 304, which may include one or more speakers operably connected to the encoder 308.

In operation, the main memory 312 may receive and store coded radio signals provided by the input device 302 via the radio receiver 314. The decoder 306 may perform a decoding process on the radio data stored in the main memory 312, which typically proceeds at a relatively fast rate because decoding is a relatively computationally-intensive process and may require a large number of operations per second by the decoder 306. For example, to decode audio data, the decoder may need to process over 20 million bits per second. When the decoder 306 needs to decode the incoming radio data from the main memory 312, the decoder 306 may request access to the main memory 312 from an arbitration unit 310, which can be included in a clock controller 316.

A handshaking process between the decoder 306, the encoder 308, and the arbitration unit 310 may occur, in which the decoder 306 requests permission from the arbitration unit 310 to access the main memory 312, and the arbitration unit 310 sends back a response granting or denying access to the main memory 312. If the decoder 306 is granted access, the clock controller 316 may cause the clock frequency at which the data and addresses are exchanged with the main memory 312 to rise to a relatively fast rate, which allows the decoder 306 to operate at a high performance level. Even though the high frequency, high performance level uses more power from the battery, it may only occur for as long as is needed for the decoder 306 to perform the decoding necessary for audio data to be reproduced at the output device 304 with adequate fidelity for a user to listen to a signal from the output device 304. Once the decoder 306 has decoded a block of data, it may write the decoded data to the main memory 312.

Once the decoder 306 performs the decoding process (e.g., at a relatively fast clock frequency) on the audio data that was received from the radio 314 and placed in the main memory 312 and writes decoded data to the main memory 312, the encoder 308 may encode the decoded data for output to the output device 304.

Before the encoder 308 can read the decoded data from the main memory 312, the encoder 308 may request access to the main memory 312 from the arbitration unit 310. A handshaking process between the decoder 306, the encoder 308, and the arbitration unit 310 may occur in which the encoder 308 requests permission from the arbitration unit 310 to access the main memory 312 and the arbitration unit 310 sends back a response granting or denying access to the main memory 312. If the encoder 306 is granted access, the clock controller 316 may cause the clock frequency at which the decoder accesses the main memory 312 to fall to a relatively slow rate, which allows the encoder 308 to operate at a high power-conservation level. For example, to encode audio data of sufficient sound quality for a listener, it may be sufficient for the encoder 308 to process only 1.5 million bits or less per second. Because less power is required to operate the encoder at a lower clock frequency, a relatively low frequency clock speed may be used so that the user does not drain the battery power too quickly.

Figure 4:
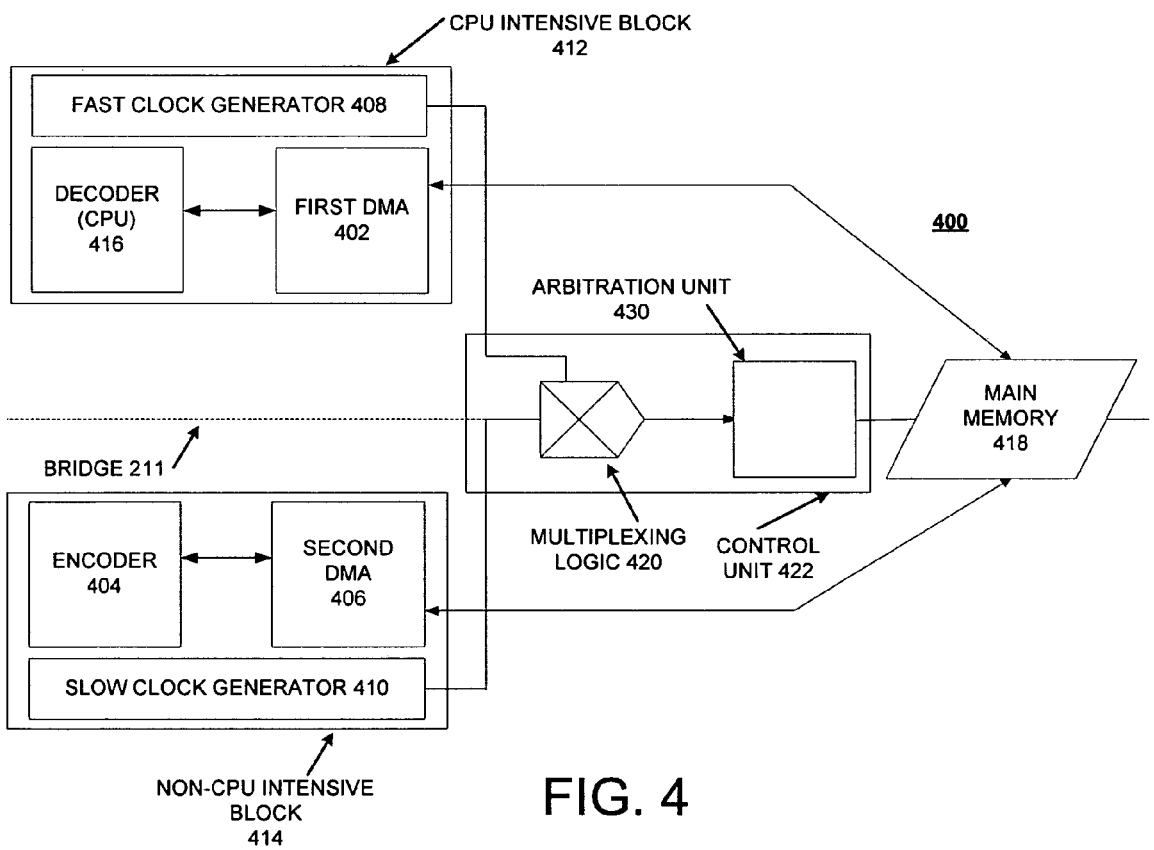
FIG. 4 is another block diagram of a system in which multiple processors can access a shared resource.

FIG. 4 is another block diagram of a system 400 in which multiple processors can access a shared resource. The system 400 can include a main memory 418 that may be accessed or otherwise used by a high-bandwidth block 412 and a low-bandwidth block 414. The high-bandwidth block 412 can reside on a first side of a bridge 211, and the low-bandwidth block 414 can reside on a second side of the bridge 211.

The high-bandwidth block 412 can include a fast clock generator 408, a decoder 416, and a first DMA 402. The high-bandwidth block 412 may operate, for example, to read encoded data from a memory device 418, and to decode the data, and to place the decoded data back into the memory 418. The low-bandwidth block 414 can include a slow clock generator 410, an encoder 404, and a second DMA 406. The low-bandwidth block 414 may operate, for example, to read decoded data from the main memory 418, and to produce encoded data, and to output the encoded data to an output device.

A control unit 422 can include a multiplexing logic unit 420 and an arbitration unit 430. The arbitration unit 430 may receive inputs from the first DMA 402 and the second DMA 406, for example, in the form of a request in a handshaking protocol. Using the handshaking protocol, the first DMA 402 or the second DMA 406 may request access to the main memory 418 along one of the input lines to the arbitration unit 430. The arbitration unit 430 may perform one or more operations or processes to determine what type of processor is requesting access to the main memory 418. For example, the arbitration unit 430 may determine whether the processor is a high-bandwidth processor or a low-bandwidth processor. Similarly, the arbitration unit 430 may determine a plurality of types of processors, from a plurality of peripheral processors, CPUs, co-processors, etc. With regard to FIG. 4, although only two blocks are shown—the high-bandwidth block 412 and the low-bandwidth block 414—more blocks also can be contemplated.

The multiplexing logic unit 420 can receive as input a signal from the fast clock generator 408 and a signal from the slow clock generator 410. The multiplexing logic unit 420 may be a multiplexer, a switch, or another control logic that may be used to change clocks. If the arbitration unit 430 answers back on a handshake request from the first DMA 402, then the multiplexing logic unit 420 may be switched or caused to push a signal from fast clock generator 408 through the control unit 422 to clock access to the main memory 418. Similarly, if the arbitration unit 430 answers back on a handshake request from the second DMA 406, then the multiplexing logic unit 420 may be switched or caused to push a signal from the slow clock generator 410 through the control unit 422 to clock access to the main memory 418.

Figure 5:
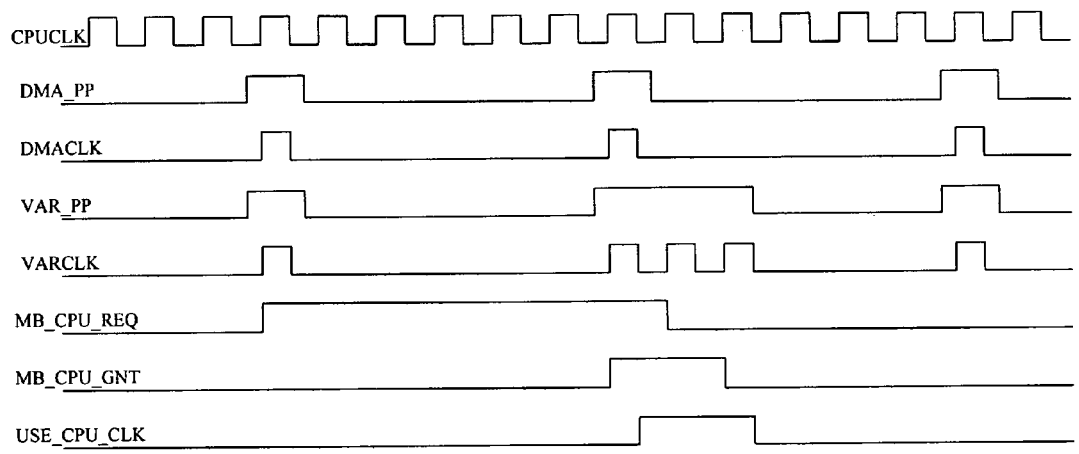
FIG. 5 is a timing diagram of signals for controlling a system in which multiple processors can access a shared resource at different clock frequencies.

FIG. 5 is a timing diagram of signals for controlling a system in which multiple processors can access a shared resource at different clock frequencies. A high-frequency clock signal CPUCLK can be generated, for example, by an oscillator, and the CPUCLK signal can be used to clock to a relatively high-bandwidth processor (e.g., a CPU) to allow the high-bandwidth processor to operate at a relatively high speed. Another clock signal corresponding to CPUCLK can be fed though a pulse swallower to produce a lower frequency signal. In one implementation, the CPUCLK signal and another signal can be input into an AND gate, and the output of the AND gate can provide a clock signal having a lower frequency than the frequency of the CPUCLK signal. For example, a signal DMA_PP that includes pulses that are approximately twice as long as the pulses of the CPUCLK signal and that can be out of phase with the CPUCLK signal can be input into an AND gate with the CPUCLK signal. The output of the AND gate can produce a DMACLK signal that is in phase with the CPUCLK signal, but that includes only one pulse for every n pulses in the CPUCLK signal, where n is an integer (e.g., n=6 in the timing diagram of FIG. 5). The DMACLK signal can be used to clock a relatively low-bandwidth processor (e.g., a DMA device coupled to a low-bandwidth encoder) to allow the low-bandwidth processor to operate at a relatively slow speed that conserves power. Thus, the DMA_PP signal can be seen as causing pulses in the CPUCLK pulse train to be swallowed when the DMA_PP signal is low and as allowing pulses on the CPUCLK pulse train to pass through to produce the pulses on the DMACLK signal when the DMA_PP signal is high.

While the CPUCLK signal has a fixed, relatively-high frequency and the DMACLK signal has a fixed, relatively-low frequency, a VARCLK signal can have a frequency that varies according to whether a high bandwidth processor or a low bandwidth processor accesses a shared resource. Thus, in one implementation, the VARCLK signal might clock a memory access controller that determines the speed with which a processor can access a shared resource, such as a memory.

The VARCLK signal can be enabled by logically ANDing a VAR_PP signal and the CPUCLK signal when the low bandwidth processor accesses the shared resource and logically ANDing the CPU_PP signal and the CPUCLK signal when the high bandwidth processor accesses the shared resource. Thus, the VARCLK signal may normally run at the lower clock frequency set by the DMA_PP signal, but just before, during, and just after the high bandwidth processor is granted access to the shared resource, the VARCLK signal can run at the higher clock frequency set by the CPU_PP signal. For example, when the lower bandwidth processor is accessing the shared resource at the low frequency given by the DMACLK signal, the higher bandwidth processor may issue a request to access the resource, for example, by setting a MB_CPU_REQ signal to a high level. The MB_CPU_REQ signal may stay high for one period of the DMACLK signal or until the next pulse period on the DMACLK signal, to provide proper synchronization between the different processors that are attempting to access the shared resource. Then, at the falling edge of the next pulse of the DMACLK signal, the request can be granted (e.g., by the memory controller 112) by setting the level of a MB_CPU_GNT signal to high. When the MB_CPU_GNT signal is set to a high state, the BAC_PP signal is allowed to remain high, such that pulses from the CPUCLK signal are passed through to be used in the VARCLK signal, and therefore the VARCLK signal temporarily has a high frequency. In this manner, the frequency of the VARCLK signal that is used to clock access to the shared resource varies depending on which processor is accessing the shared resource. Thus, the VARCLK signal used to clock access to the shared resource generally operates at the low frequency set by the DMACLK signal, but when the high bandwidth processor (e.g., the CPU) accesses the shared resource, VARCLK signal operates at the high frequency given by the CPU CLK signal.

In another implementation, the VARCLK signal may be provided and used to clock access to the shared resource by sending the CPUCLK signal through a pulse swallower that is turned on and swallows pulses, except when the level of BAC_PP is high. A clock arbiter can control the level of BAC_PP. For example, normally the clock arbiter may set the level of BAC PP high only for every n pulses of the CPUCLK signal, where n is an integer. Thus, in one implementation, the ratio between the frequencies of the fast and slow clocks can be between 1 and 10. In one another implementation, the ratio between the frequencies of the fast and slow clocks can be between 10 and 100. In one another implementation, the ratio between the frequencies of the fast and slow clocks can be between 100 and 1000. In one another implementation, n can be between 1000 and 10,000. In one another implementation, the ratio between the frequencies of the fast and slow clocks can be greater than 10,000.

Figure 6:
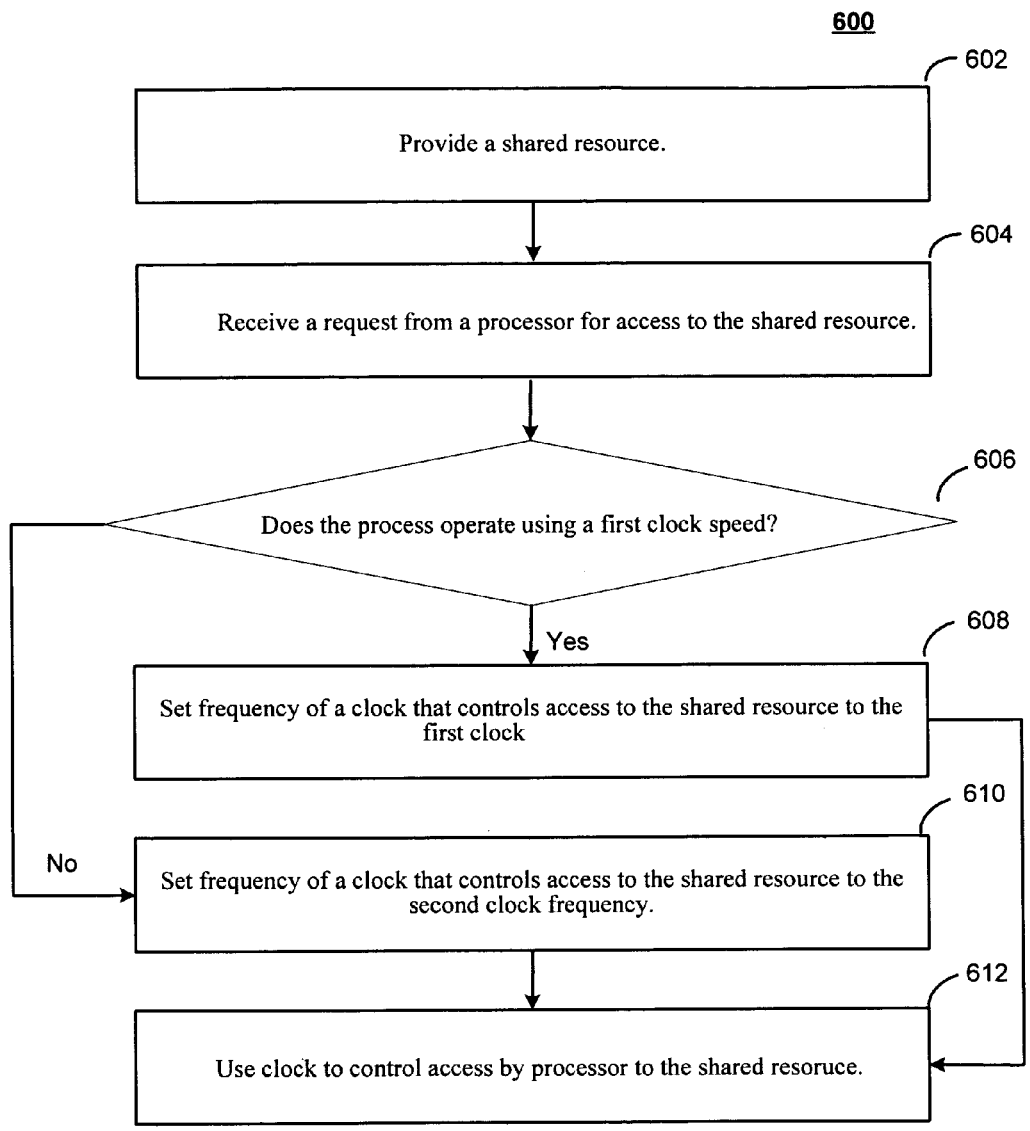
FIG. 6 is a flowchart of a process for optimizing access to a shared resource system.

FIG. 6 is a flowchart of a process for optimizing access to a shared resource system. A shared resource is provided (602). The shared resource may be, for example, a memory device, such as a main memory, a RAM, a ROM, a flash memory, and the like. A request is received for access to the shared resource from a first processor (604). The first processor may be, for example, a CPU, a decoder, an encoder, a co-processor, or a peripheral processor.

At a decision (606) it is determined if the processor operates using a first clock speed. For example, the first clock speed may be used to perform an operation at a relatively high frequency, such as by a CPU or by a decoder. If the processor does operate at a first clock speed, the frequency of a clock that controls access to the shared resource is set to the first clock frequency (608). Otherwise, the frequency of the clock is set to the second clock frequency (610).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the examples of the invention.

What is claimed is:

1. A method comprising:
receiving a request at an arbitration unit from a Bluetooth decoder for access to a radio signal stored in a shared memory of a Bluetooth device, wherein the Bluetooth decoder includes a high bandwidth processor that is configured to access the shared memory and decode the radio signal at a first clock frequency and wherein the shared memory is configured to operate at a variable shared memory clock frequency to conserve power of the Bluetooth device;
receiving a request at the arbitration unit from a Bluetooth encoder for access to the shared memory of the Bluetooth device, wherein the Bluetooth encoder includes a low bandwidth processor that is configured to encode the decoded radio signal at a second clock frequency that is lower than the first clock frequency;
providing access by the Bluetooth decoder to the shared memory by the arbitration unit setting the shared memory clock frequency to the first clock frequency; and
providing access by the Bluetooth encoder to the shared memory by the arbitration unit setting the shared memory clock frequency to the second clock frequency to use less of the power of the Bluetooth device when the Bluetooth encoder accesses the shared memory as compared to when the Bluetooth decoder accesses the shared memory.

2. The method of claim 1 wherein the providing access by the Bluetooth decoder comprises:
generating a first clock signal having a frequency equal to the first clock frequency; and
providing the first clock signal to the shared memory to clock access to the shared memory for the Bluetooth decoder.

3. The method of claim 1 wherein the providing access by the Bluetooth encoder comprises:
generating a second clock signal having a frequency equal to the second clock frequency; and
providing the second clock signal to the shared memory to clock access to the shared memory for the Bluetooth encoder.

4. The method of claim 3 wherein generating the second clock signal comprises removing pulses from the first clock signal.

5. The method of claim 1 wherein the Bluetooth decoder and Bluetooth decoder are configured on a chip and wherein the chip is powered by a battery.

6. The method of claim 5 wherein the arbitration unit is configured to arbitrate access to the shared memory to save power on the battery.

7. The method of claim 1 wherein the first clock frequency is at least twice the second clock frequency.

8. A system comprising:
a Bluetooth decoder that is operably coupled to a shared resource and that is configured to access the shared resource in a computing system, wherein the Bluetooth decoder includes a high bandwidth processor that is configured to operate at a first clock frequency and wherein the shared resource is configured to operate at a variable clock frequency;
an Bluetooth encoder that is operably coupled to the shared resource and that is configured to access the shared resource, wherein the Bluetooth encoder includes a low bandwidth processor that is configured to operate at a second clock frequency, wherein the second clock frequency is lower than the first clock frequency;
a control unit that is operably coupled to the Bluetooth decoder, the Bluetooth encoder and the shared resource and that is configured to receive requests from the Bluetooth decoder and the Bluetooth encoder for access to the shared resource; and
clock circuitry that is operably coupled to the Bluetooth decoder, the Bluetooth encoder, the shared resource and the control unit and that is configured to provide a clock signal for clocking access to the shared resource, wherein the control unit is configured to cause the clock circuitry to provide the clock signal with the first clock frequency when the control unit grants the Bluetooth decoder access to the shared resource and wherein the control unit is configured to cause the clock circuitry to provide the clock signal with the second clock frequency when the control unit grants the Bluetooth encoder access to the shared resource.

9. The system of claim 8 wherein the shared resource comprises a memory device.

10. The system of claim 8 wherein the Bluetooth encoder comprises a Bluetooth configured Bluetooth encoder and the Bluetooth decoder comprises a Bluetooth configured Bluetooth decoder.

11. The system of claim 8 further comprising a battery configured to power the system, wherein the system comprises a system on a chip and wherein the system on a chip comprises the Bluetooth decoder, the Bluetooth encoder, the control unit, and the clock circuitry.

12. The system of claim 8 wherein the first clock frequency is at least twice the second clock frequency.

13. The system of claim 8 further comprising a pulse swallower configured to generate the second clock frequency by receiving an input of the first clock frequency and selectively removing pulses from the input signal.

14. The system of claim 8 further comprising circuitry for receiving an encoded audio signal, decoding the audio signal, and outputting the decoded signal to an audio output device.

15. The system of claim 8 further comprising a speaker for playing a signal as decoded by the Bluetooth decoder.

16. The system of claim 15, wherein the decoded signal is stored in the shared resource.

* * * * *